United States Patent
Ristoski et al.

(10) Patent No.: US 11,124,240 B2
(45) Date of Patent: Sep. 21, 2021

(54) INTERLOCKING EXTRUDED VEHICLE RAIL ASSEMBLY

(71) Applicant: GM GLOBAL TECHNOLOGY OPERATIONS LLC, Detroit, MI (US)

(72) Inventors: Robert Ristoski, Shelby Township, MI (US); Robert N. Saje, Shelby Township, MI (US); Peter M. Parlow, Columbus, MI (US); Gregory McCurry, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 16/131,130

(22) Filed: Sep. 14, 2018

(65) Prior Publication Data
US 2020/0086925 A1    Mar. 19, 2020

(51) Int. Cl.
  *B62D 29/00*    (2006.01)
  *B62D 25/06*    (2006.01)
  *B21C 23/14*    (2006.01)

(52) U.S. Cl.
  CPC ............ *B62D 25/06* (2013.01); *B21C 23/142* (2013.01); *B62D 29/008* (2013.01)

(58) Field of Classification Search
  CPC .......... F16B 7/044; F16B 7/0446; F16B 7/18; F16B 12/06; F16B 12/30; F16B 12/40; F16B 12/50; Y10T 403/7043; Y10T 403/7096; Y10T 403/7123; Y10T 403/7152; Y10T 403/73; Y10T 403/65; Y10T 403/655; Y10T 403/70; Y10T 403/7045; B62D 25/04; B62D 29/008; B62D 21/157; B62D 27/023
  USPC .......... 52/848, 653.2, 655.1, 656.9; 138/109, 138/115, 116, 155, DIG. 11, 178
  See application file for complete search history.

(56) References Cited

U.S. PATENT DOCUMENTS

| 1,257,337 | A | * | 2/1918 | Garvin | E04B 1/3205 52/245 |
| 1,834,643 | A | * | 12/1931 | Reinking | F16L 9/01 138/155 |
| 1,883,586 | A | * | 10/1932 | Corrington | G01C 9/26 403/331 |
| 2,316,319 | A | * | 4/1943 | Demarest | E04B 2/14 138/115 |

(Continued)

FOREIGN PATENT DOCUMENTS

| AT | 519258 B1 | * | 5/2018 | ............ F16B 7/0446 |
| CN | 108286389 A | * | 7/2018 | |

(Continued)

*Primary Examiner* — Amber R Anderson
*Assistant Examiner* — Zachary A Hall

(57) ABSTRACT

An extruded rail assembly including a first multi-channel extrusion having at least two tubular channels connected by a center rib, and having a joining end configured for joining at a predetermined angle to a joining end of a second multi-channel extrusion. The second multi-channel extrusion includes at least two tubular channels connected by a center rib, and having a joining end configured for joining at the predetermined angle to the joining end of first multi-channel extrusion. The joining ends of the first and second multi-channel extrusions are configured such that the center ribs complementarily engage as a joining surface.

14 Claims, 4 Drawing Sheets

(56) References Cited

U.S. PATENT DOCUMENTS

| | | | | |
|---|---|---|---|---|
| 3,355,195 | A | * | 11/1967 | Takayanagi ............ E04G 1/151 403/364 |
| 3,786,612 | A | * | 1/1974 | Baker ..................... F16B 12/40 403/295 |
| 4,342,177 | A | * | 8/1982 | Smith ....................... E04B 1/24 52/93.1 |
| 4,389,138 | A | * | 6/1983 | Soderstrom ........... E02B 11/005 405/43 |
| 4,637,147 | A | * | 1/1987 | Wolsey ................... D06C 3/08 144/347 |
| 5,820,292 | A | * | 10/1998 | Fremstad ............... A47G 1/102 403/403 |
| 7,739,841 | B1 | * | 6/2010 | Puckett .................... E04C 3/40 52/93.1 |
| 8,635,830 | B2 | * | 1/2014 | Schold ..................... E04B 1/19 52/650.1 |
| 9,560,924 | B2 | * | 2/2017 | Lawson ............... A47G 1/0605 |
| 2010/0202827 | A1 | * | 8/2010 | Frey ......................... A47G 1/10 403/359.3 |
| 2016/0090733 | A1 | * | 3/2016 | Cheung .................... E04C 3/11 52/656.9 |
| 2016/0356076 | A1 | * | 12/2016 | Isaacs ................... E06B 3/9682 |
| 2017/0158244 | A1 | * | 6/2017 | Bach .................... B62D 21/157 |

FOREIGN PATENT DOCUMENTS

| | | | | |
|---|---|---|---|---|
| DE | 202014102487 U1 | * | 7/2014 | ............ A63H 33/102 |
| FR | 1404258 A | * | 6/1965 | ............ F16B 7/0446 |
| GB | 2497764 A | * | 6/2013 | ............ F16B 7/0446 |
| JP | 2004344426 A | * | 12/2004 | |
| WO | WO-9612863 A1 | * | 5/1996 | ....... B29C 66/52431 |
| WO | WO-2014144212 A1 | * | 9/2014 | ............ F16B 7/0446 |
| WO | WO-2017096449 A1 | * | 6/2017 | ............... A47B 3/06 |

* cited by examiner

INTERLOCKING EXTRUDED VEHICLE RAIL ASSEMBLY

FIELD

The present disclosure relates to hollow vehicle rail extrusions and more particularly to an interlocking extruded vehicle rail assembly.

BACKGROUND

This section provides background information related to the present disclosure which is not necessarily prior art.

In vehicle body structures it is common to mount energy absorbing units on the outer ends of the front and rear frame rails and pillars to support the front and rear bumpers of the vehicle and absorb impact loads below a predetermined value. The frame rails and pillars are thus subject to the impact loads received by the suspension components as well as the bumpers. In the case of pillars on four-door sedans, for example the B pillar is typically a closed metal structure welded at the bottom to the car's rocker panel and floor pan, as well as on the top to the roof rail or panel. This pillar provides structural support for the vehicle's roof panel and is designed for latching the front door and mounting the hinges for the rear doors. The present disclosure provides a low investment rail and pillar assembly using metal extrusions with significant side view geometry while improving bending stiffness, section stability and strength.

SUMMARY

This section provides a general summary of the disclosure, and is not a comprehensive disclosure of its full scope or all of its features.

In accordance with an exemplary embodiment, an extruded assembly includes a first multi-channel extrusion having at least two tubular channels connected by a center rib, and having a joining end wherein the joining end is configured for joining at a predetermined angle to a joining end of a second multi-channel extrusion. And another aspect wherein the second multi-channel extrusion having at least two tubular channels connected by a center rib, and having a joining end wherein the joining end is configured for joining at the predetermined angle to the joining end of first multi-channel extrusion. And still another aspect wherein the joining ends of the first and second multi-channel extrusions are configured such that the center ribs complementarily engage as a joining surface.

Another aspect of the exemplary embodiment is provided wherein the joining ends of the first and second multi-channel extrusions further include an access hole in an outer wall opposite the joining surface of the center ribs. And another aspect includes a structural cover plate configured for reinforcing around the access hole in the outer wall of the first and second multi-channel extrusions. Still another aspect includes an upper reinforcing cap for fastening to a top surface of the joining ends of the first and second multi-channel extrusions. And yet another aspect includes a lower reinforcing cap for fastening to bottom surface of the joining ends of the first and second multi-channel extrusions. And one other aspect wherein the outer wall of the joining ends of the first and second multi-channel extrusions are joined using a MIG welding process.

Further aspects in accordance with exemplary embodiments wherein the center ribs are joined using metal inert gas (MIG) welds, structural adhesives, or flow form screws. And other aspects wherein the predetermined angle is an obtuse angle, and wherein the first and second multi-channel extrusions are formed from an aluminum or aluminum composite material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Figure 1:
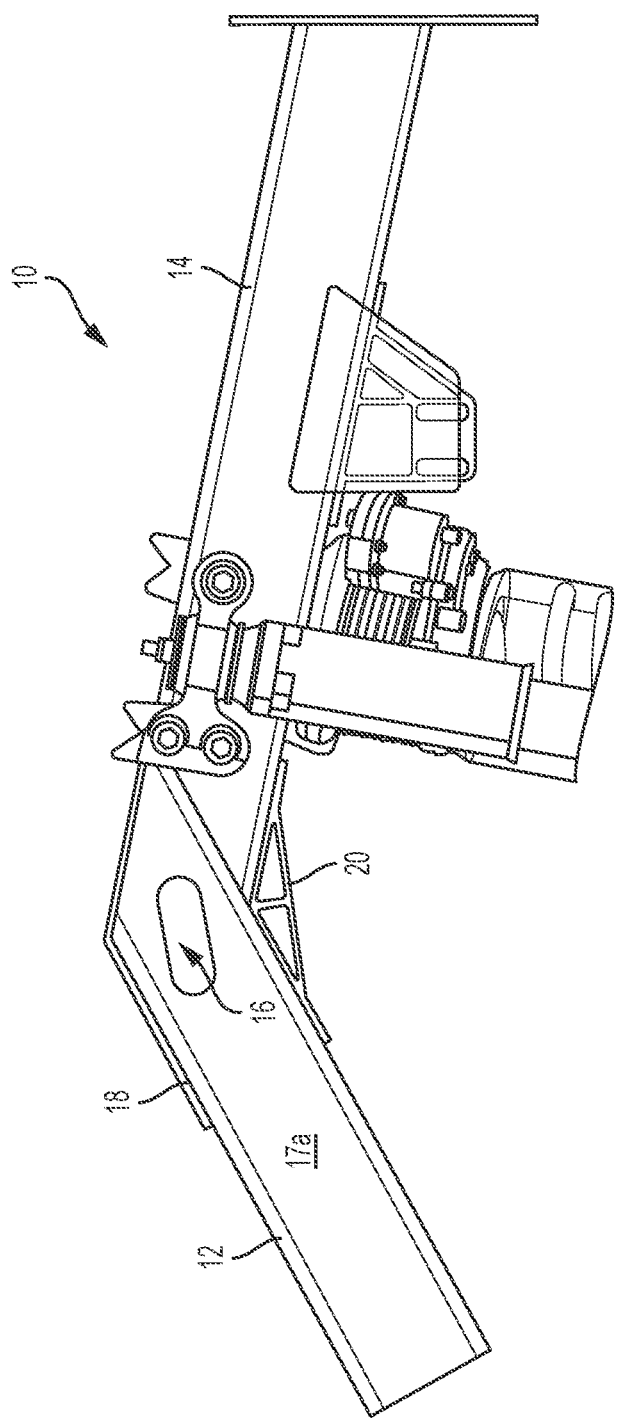
FIG. 1 is an illustration of an interlocking extruded vehicle rail and pillar assembly in accordance with an exemplary embodiment.

FIG. 1 is an illustration of an interlocking extruded vehicle rail and/or pillar assembly 10 in accordance with an exemplary embodiment. The assembly 10 includes a first multi-channel extrusion 12 having at least two tubular channels 24 connected by a center rib 25 (see FIG. 3A). The first multi-channel extrusion 12 includes a joining end 13a that is configured for joining at a predetermined angle to a joining end 13b of a second multi-channel extrusion 14 (see FIG. 2). The first and second multi-channel extrusions (12, 14) may be formed of a variety of high strength materials such as metal or metal alloys but a preferred embodiment is formed of a material that provides high strength and lightweight properties such as aluminum or an aluminum alloy.

Figure 2:
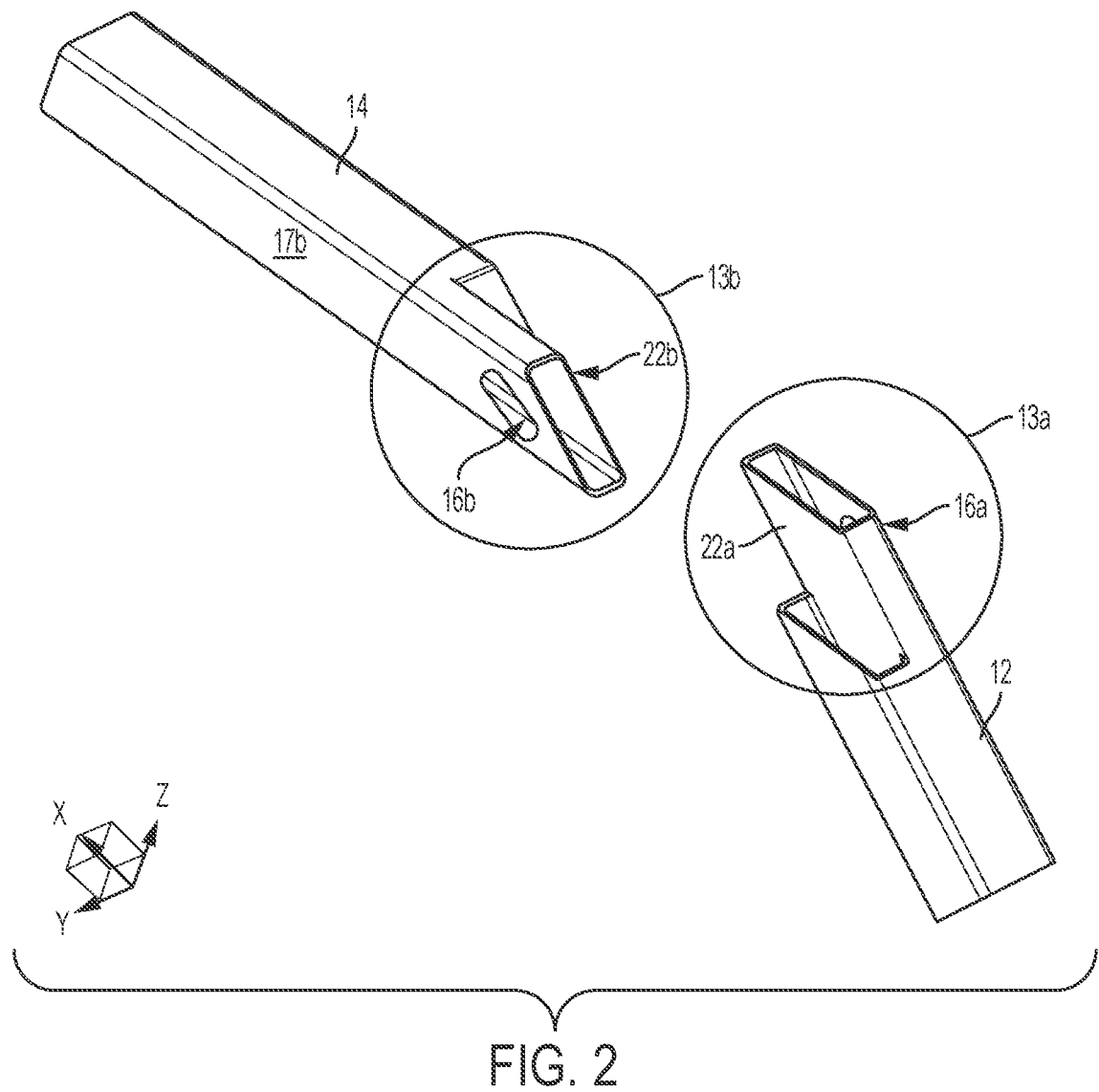
FIG. 2 illustrates multi-channel extrusions having two tubular channels in accordance with the exemplary embodiment.
Figure 3A:
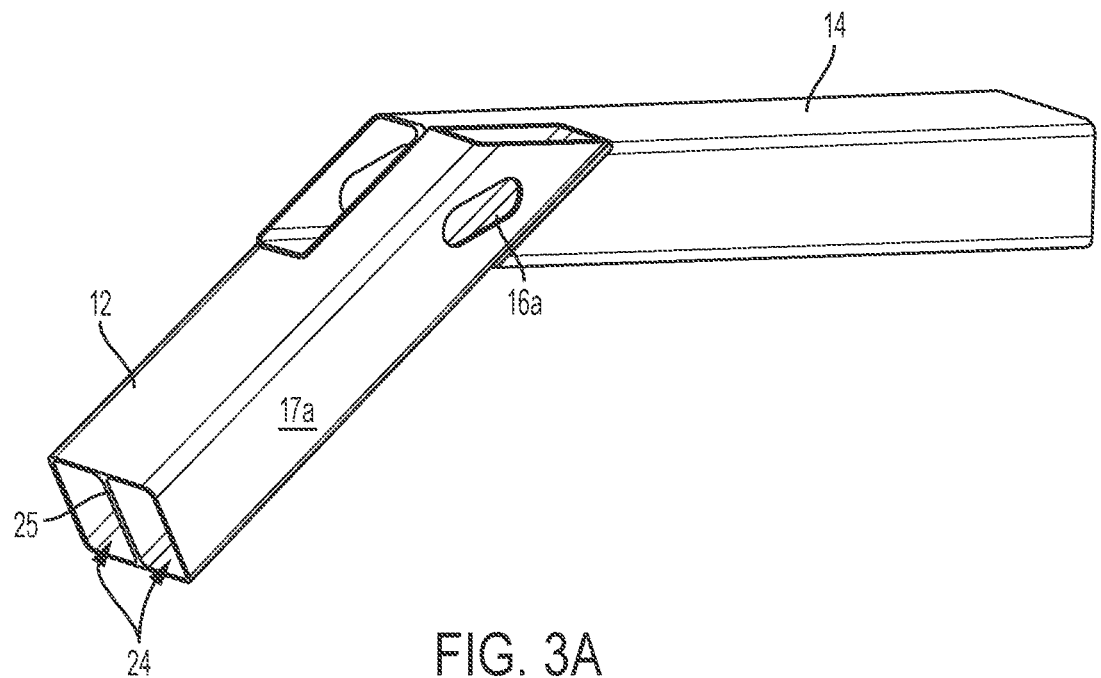
FIG. 3A is an illustration of a perspective view of the interlocking multi-channel extrusions in accordance with the exemplary embodiment.
Figure 3B:
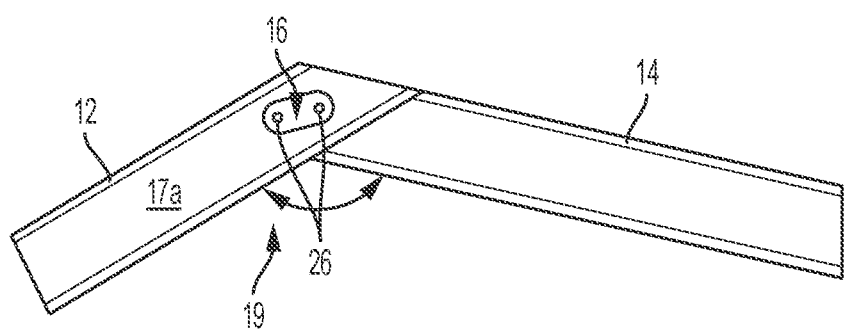
FIG. 3B is an illustration of a side view of the interlocking multi-channel extrusions in accordance with the exemplary embodiment.

Referring now to FIGS. 1, 2, 3a and 3b, the multi-channel extrusions (12, 14) include an access hole 16 in an outer wall (17a, 17b) opposite the joining surfaces (22a, 22b) of the center ribs 25. The joining ends (13a, 13b) of the first and second multi-channel extrusions (12, 14) are configured such that the center ribs 25 complementarily engage at the joining surfaces (22a, 22b). As best shown in FIG. 3b, the joining ends (13a, 13b) of the first and second multi-channel extrusions (12, 14) are configured for joining at the predetermined angle 19. In one exemplary embodiment, the predetermined angle 19 is an obtuse angle but it is appreciated that the predetermined angle 19 can be configured as a one hundred eighty degree, a ninety degree, or an acute angle without exceeding the scope of the disclosure.

Referring to FIGS. 2 and 3b, the joining surfaces (22a, 22b) of the first and second multi-channel extrusions (12, 14) may be joined together using flow form screws 26 which can be made through the access hole (16a, 16b) formed in the outer wall (17a, 17b) of the multi-channel extrusions (12, 14). Other methods of joining the first and second multi-channel extrusions (12, 14) include, but not limited to, flow drill screws, self-piercing rivets, and bolts.

Figure 4:
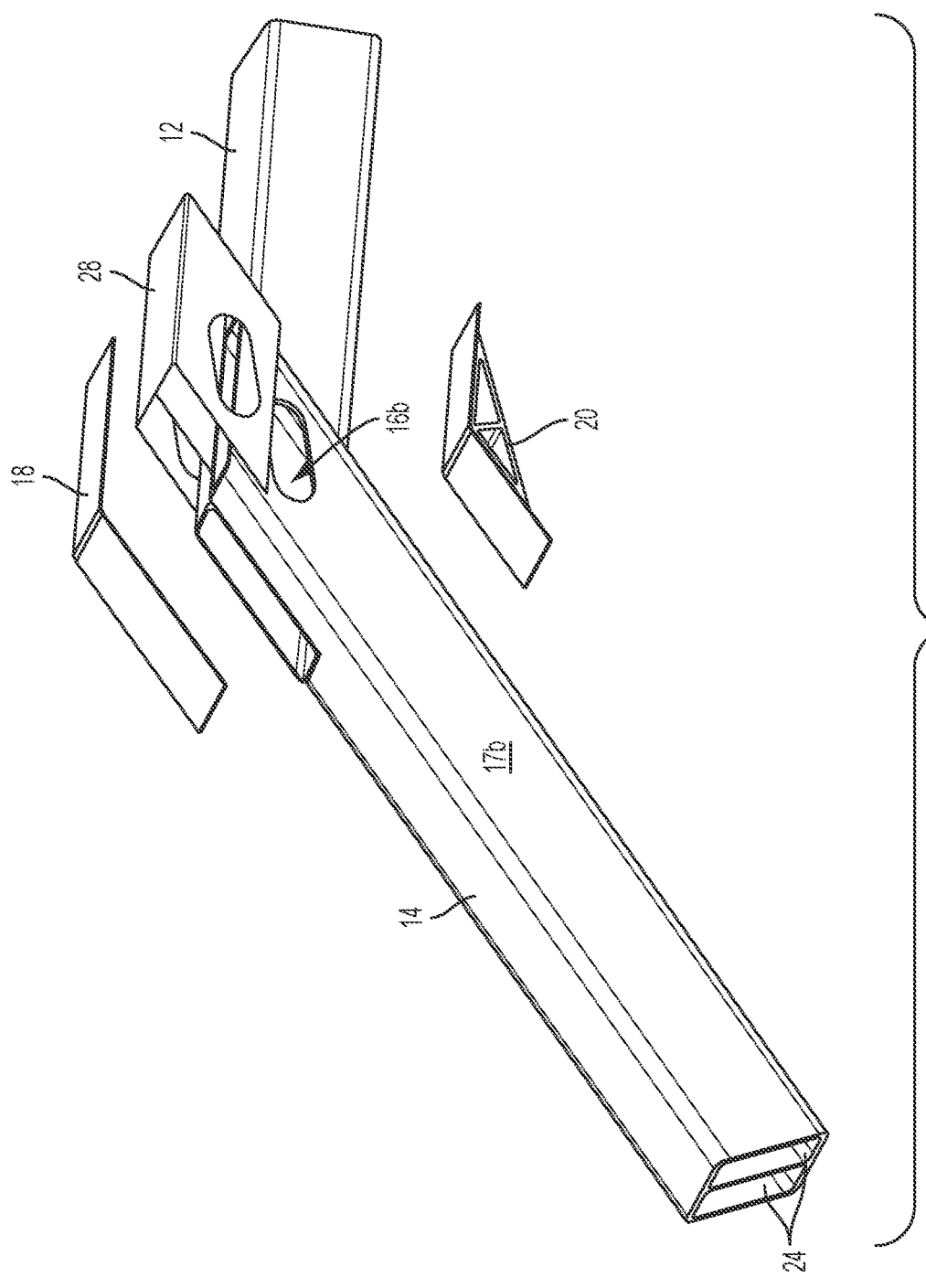
FIG. 4 is an illustration of an exploded view of the interlocking extruded vehicle rail and pillar assembly in accordance with aspects of the exemplary embodiment.

Referring now to FIG. 4, an exploded view of the interlocking extruded vehicle rail and/or pillar assembly in accordance with aspects of the exemplary embodiment is provided. The assembly 10 includes an upper reinforcing cap 18 for fastening to a top surface of the joining ends (13a, 13b) of the first and second multi-channel extrusions (12, 14), and a lower reinforcing cap 20 for fastening to bottom surface of the joining ends (13a, 13b) of the first and second multi-channel extrusions (12, 14). The assembly 10 also includes a structural cover plate 28 configured for reinforcing around the access hole (16a, 16b) in the outer wall (17a, 17b) of the first and second multi-channel extrusions (12, 14). The structural cover plate 28 is fastened to the outer walls (17a, 17b) of the first and second multi-channel extrusions (12, 14) using joining methods such as flow form screws, metal inert gas (MIG) welds, structural adhesives or other suitable fastening methods. The outer wall of the joining ends of the first and second multi-channel extrusions may also be joined using a MIG welding process. The MIG welds provide a high strength joining method for the first and second multi-channel extrusions which obviates the need for adding reinforcing components such as the upper reinforcing cap 18 in accordance with one embodiment. As disclosed above an interlocking extruded vehicle rail assembly 10 is provided as a low cost rail assembly formed of aluminum extrusions that provide high bending stiffness, section stability and strength.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An extruded rail assembly comprising:
   a first multi-channel extrusion having at least two tubular channels connected by a center rib, and having a joining end wherein the joining end is configured for joining at a predetermined angle to a joining end of a second multi-channel extrusion, wherein at least one of the at least two tubular channels extends beyond the other of the at least two tubular channels to define the center rib as a joining surface;
   the second multi-channel extrusion having at least two tubular channels connected by a center rib, and having the joining end wherein the joining end is configured for joining at the predetermined angle to the joining end of the first multi-channel extrusion, wherein at least one of the at least two tubular channels extends beyond the other of the at least two tubular channels to define the center rib as a joining surface; and
   wherein the joining ends of the first and second multi-channel extrusions are configured such that the center ribs complementarily directly engage along the respective joining surfaces of the first multi-channel extrusion and the second multi-channel extrusion and wherein the center ribs are joined using flow form screws.

2. The assembly of claim 1 wherein the joining ends of the first and second multi-channel extrusions further comprises an access hole in an outer wall opposite the joining surfaces of the center ribs.

3. The assembly of claim 2 further comprising a structural cover plate configured for reinforcing around the access hole in the outer wall of the first and second multi-channel extrusions.

4. The assembly of claim 1 further comprising an upper reinforcing cap for fastening to a top surface of the joining ends of the first and second multi-channel extrusions.

5. The assembly of claim 1 further comprising a lower reinforcing cap for fastening to a bottom surface of the joining ends of the first and second multi-channel extrusions.

6. The assembly of claim 2 wherein the outer wall of the joining ends of the first and second multi-channel extrusions are joined using a MIG welding process.

7. The assembly of claim 1 wherein the first and second multi-channel extrusions are formed from an aluminum or aluminum composite material.

8. An extruded rail assembly formed of an aluminum or aluminum composite material comprising:
   a first multi-channel extrusion having at least two tubular channels connected by a center rib, and having a joining end wherein the joining end is configured for joining at a predetermined angle to a joining end of a second multi-channel extrusion, wherein at least one of the at least two tubular channels extends beyond the other of the at least two tubular channels to define the center rib as a joining surface;
   the second multi-channel extrusion having at least two tubular channels connected by a center rib, and having the joining end wherein the joining end is configured for joining at the predetermined angle to the joining end of the first multi-channel extrusion, wherein at least one of the at least two tubular channels extends beyond the other of the at least two tubular channels to define the center rib as a joining surface; and
   wherein the joining ends of the first and second multi-channel extrusions are configured such that the center ribs complementarily directly engage along the respective joining surfaces of the first multi-channel extrusion and the second multi-channel extrusion, and wherein the center ribs are joined using MIG welds.

9. The assembly of claim 8 wherein the joining ends of the first and second multi-channel extrusions further comprises an access hole in an outer wall opposite the joining surface of the center ribs.

10. The assembly of claim 9 further comprising a structural cover plate configured for reinforcing around the access hole in the outer wall of the first and second multi-channel extrusions.

11. The assembly of claim 8 further comprising an upper reinforcing cap for fastening to a top surface of the joining ends of the first and second multi-channel extrusions.

12. The assembly of claim 8 further comprising a lower reinforcing cap for fastening to a bottom surface of the joining ends of the first and second multi-channel extrusions.

13. The assembly of claim 8 wherein the predetermined angle is an obtuse angle.

14. An extruded rail assembly formed of an aluminum or aluminum composite material comprising:

- a first multi-channel extrusion having at least two tubular channels connected by a center rib, and having a joining end wherein the joining end is configured for joining at a predetermined angle to a joining end of a second multi-channel extrusion, wherein at least one of the at least two tubular channels extends beyond the other of the at least two tubular channels to define the center rib as a joining surface;
- the second multi-channel extrusion having at least two tubular channels connected by a center rib, and having the joining end wherein the joining end is configured for joining at the predetermined angle to the joining end of the first multi-channel extrusion, wherein at least one of the at least two tubular channels extends beyond the other of the at least two tubular channels to define the center rib as a joining surface; and
- wherein the joining ends of the first and second multi-channel extrusions are configured such that the center ribs complementarily directly engage along the respective joining surfaces of the first multi-channel extrusion and the second multi-channel extrusion, wherein the joining ends of the first and second multi-channel extrusions further comprise an access hole in an outer wall opposite the joining surface of the center ribs, and wherein the outer wall of the joining ends of the first and second multi-channel extrusions are joined using a MIG welding process.

* * * * *